United States Patent
Feller

(10) Patent No.: US 7,656,349 B2
(45) Date of Patent: Feb. 2, 2010

(54) ENHANCEMENT OF GNSS POSITION DETERMINATION IN POOR SIGNAL PROPAGATION ENVIRONMENTS

(75) Inventor: Walter J. Feller, Airdrie (CA)

(73) Assignee: NovAtel Inc., Calgary, Alberta (CA)

( * ) Notice: Subject to any disclaimer, the term of this patent is extended or adjusted under 35 U.S.C. 154(b) by 166 days.

(21) Appl. No.: 11/694,368

(22) Filed: Mar. 30, 2007

(65) Prior Publication Data

US 2007/0241960 A1    Oct. 18, 2007

Related U.S. Application Data

(60) Provisional application No. 60/787,428, filed on Mar. 30, 2006.

(51) Int. Cl.
*G01S 1/02* (2006.01)
*G01S 5/14* (2006.01)

(52) U.S. Cl. .............. 342/357.03; 342/357.02; 342/357.09

(58) Field of Classification Search .......... 342/357.02, 342/357.03, 357.06, 357.09, 357.12; 701/213, 701/215
See application file for complete search history.

(56) References Cited

U.S. PATENT DOCUMENTS

| 3,742,498 | A  | * | 6/1973 | Dunn ........................... 342/88 |
| 5,786,773 | A  | * | 7/1998 | Murphy ....................... 340/947 |
| 6,212,475 | B1 |   | 4/2001 | France et al. |
| 6,556,942 | B1 | * | 4/2003 | Smith ........................ 702/150 |
| 6,560,535 | B2 |   | 5/2003 | Levy et al. |
| 2003/0058163 | A1 | * | 3/2003 | Zimmerman et al. ... 342/357.08 |
| 2003/0085839 | A1 |   | 5/2003 | Zhodzishky et al. |
| 2004/0130485 | A1 |   | 7/2004 | Rapoport et al. |

* cited by examiner

*Primary Examiner*—Dao L Phan
(74) *Attorney, Agent, or Firm*—Cesari and McKenna, LLP; Patricia A. Sheehan

(57) ABSTRACT

A system, for enhancing location estimates by movable rovers that use receivers for processing ranging signals from orbiting satellites, including a fixed base station that serves as a ranging signal source for the rovers' receivers. The base station may also determine and transmit the azimuthal angles of the respective rovers. The rovers use this information, along with a calculated or transmitted ranges to the base station to calculate the ranging system times at the locations of the rovers. Further, the rovers may use the information along with signals from satellites in view to determine position.

27 Claims, 2 Drawing Sheets

ENHANCEMENT OF GNSS POSITION DETERMINATION IN POOR SIGNAL PROPAGATION ENVIRONMENTS

CROSS-REFERENCE TO RELATED APPLICATION

The present application claims the benefit of U.S. Provisional Patent Application Ser. No. 60/787,428, which was filed on Mar. 30, 2006, by Walter J. Feller for ENHANCEMENT OF GPS POSITION DETERMINATION IN POOR SIGNAL PROPAGATION ENVIRONMENTS and is hereby incorporated by reference.

FIELD OF THE INVENTION

This invention relates generally to GNSS systems and, in particular, to an improvement in position information acquired by a movable GNSS receiver.

BACKGROUND INFORMATION

In the following description the term "rover" is applied to moveable receivers, whether they are attached to moving rovers or are otherwise moved about from time to time.

In some applications it is desirable for rovers to monitor their positions and this is usually accomplished by receivers, e.g., GPS or GLONASS receivers, which calculate their positions by means of ranging signals transmitted by earth-orbiting satellites. To provide a position determination in three coordinates, a receiver must receive ranging signals from four satellites, preferably more, to lessen the errors due to noise and multipath distortion. With signals from four satellites, the receiver can calculate the ranging system's time at its location and also its position in three coordinates.

At times a rover may enter an area where trees and/or various other objects impede the signal reception from some of the satellites, thus degrading the accuracy of position determination. Various arrangements have been used to cope with this problem in automobiles, for example, but these solutions are not suitable for some small rovers, such as golf carts moving over golf courses because of, for example, associated costs and complexities. The present invention deals with these situations.

SUMMARY OF THE INVENTION

The following description refers specifically to GPS satellites. However, it is equally applicable to other satellite position-locating systems. In an arrangement incorporating the invention, a fixed base station, which has a known position, broadcasts to the rovers an RF signal that is modulated with a pseudo-random code having a similar length and chip rate as the ranging signals transmitted by the satellites, but having a different sequence from that used by any of the satellites. This signal is timed according to GPS time at the base station, and is thus another ranging signal for the rover. The base station may transmit over a portion of the frequency spectrum that does not require a license, e.g. the ISM (Industrial/Scientific and Medical) bands, and the transmission preferably has a is bandwidth at least as wide as the bandwidth of GPS transmissions.

Each rover receives the ranging signal from the base station and aligns its code generator and carrier phase with that signal. If a rover can process signals from only three satellites, the base station serves as a ranging transmitter which is synchronous with the satellite system and, thus, serves as the required fourth satellite for a complete determination of the rover's position. Even if the rover can process the signals from four or more orbiting satellites, signals from the base station enhance the rover's position determinations, as set forth hereinafter.

If a rover can receive useful signals from only two satellites, the base station can calculate its range to the rover by comparing the timing of its transmission with the timing of a return signal from the rover. The base station then transmits this information to the rover by, for example, modulation of the ranging signal broadcast by the base station. Further, the GPS time at the rover's position can be determined by Two-Way-Time-Transfer (TWTT) between the rover and the base station. The rover thus has enough parameters to calculate its position.

Finally, if the rover receives usable information from only a single satellite, a somewhat less accurate estimate of the rover's position can be obtained by ascertaining the intersection of a sphere centered on the satellite with a radius equal to the calculated range between the rover and the satellite, i.e. the measured pseudorange adjusted in accord with the rover's estimate of its clock error (as determined by the use of TWTT), and the horizontal circle centered at the base station with radius equal to the calculated range between the base station and the rover. The ambiguity between the two possible intersecting points can be resolved by using the estimate of the rover's direction from the base station (calculated from the phase differences in the antennas used for receipt of transmissions from the rover), or the closer point to the last computed position of the rover.

The base station also broadcasts in its transmissions information about the GPS (or like) satellite signals, including identification of the satellites within its view, Doppler offsets of the signals from those satellites, messages transmitted by the satellites and other information that may be useful in processing satellite signals. This will assist the rovers in acquiring and tracking the satellite signals even in very weak-signal environments. The information will also permit the rovers to improve their positional accuracies as is known in the art. This information may be broadcast by modulation of the broadcast ranging signal.

A further advantage of a terrestrial source for ranging information is that it provides better geometry in the rovers' solutions. This is because the rovers are typically attempting to solve for the independent variables of height and receiver clock error, as well as longitude and latitude, from measurements that are mainly in the vertical direction, since the satellites are always above the rovers. The mathematics has difficulty separating the contributions of the height and receiver clock error parameters and, as a result, the estimates of these parameters are inaccurate as compared with those of the horizontal components (latitude and longitude). The clock and height errors are typically two to three times worse than the errors in estimating the horizontal components of the rover's position. The addition of the terrestrial source ranging measurement into the equations for rover position is used to separate the height and clock errors, which provides for more accuracy in position determination.

The clock error can also be independently determined using only TWTT from the base station and, therefore, the clock error can be removed from the list of unknown parameters. With an accurate estimate of the receiver clock error, the rover's height component estimate will become more accurately observable from the satellite signals. This would be extremely useful for applications requiring accurate height determination such as, for example, earth excavation and road paving, and is a distinct advantage in cost savings and ease of use over systems that, for example, determine height using lasers.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
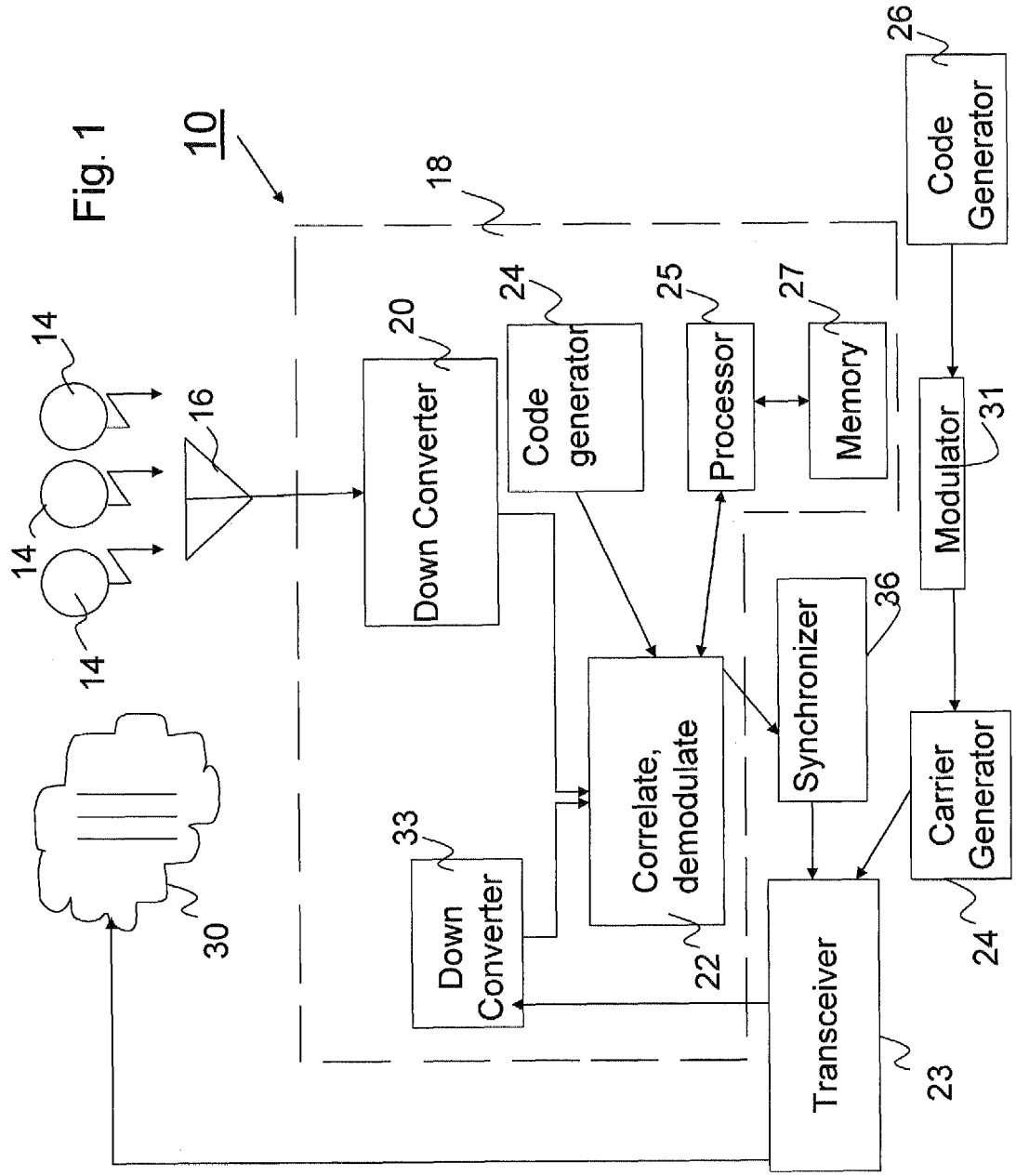
FIG. 1 is a schematic diagram of a base station incorporating the invention.
Figure 2:
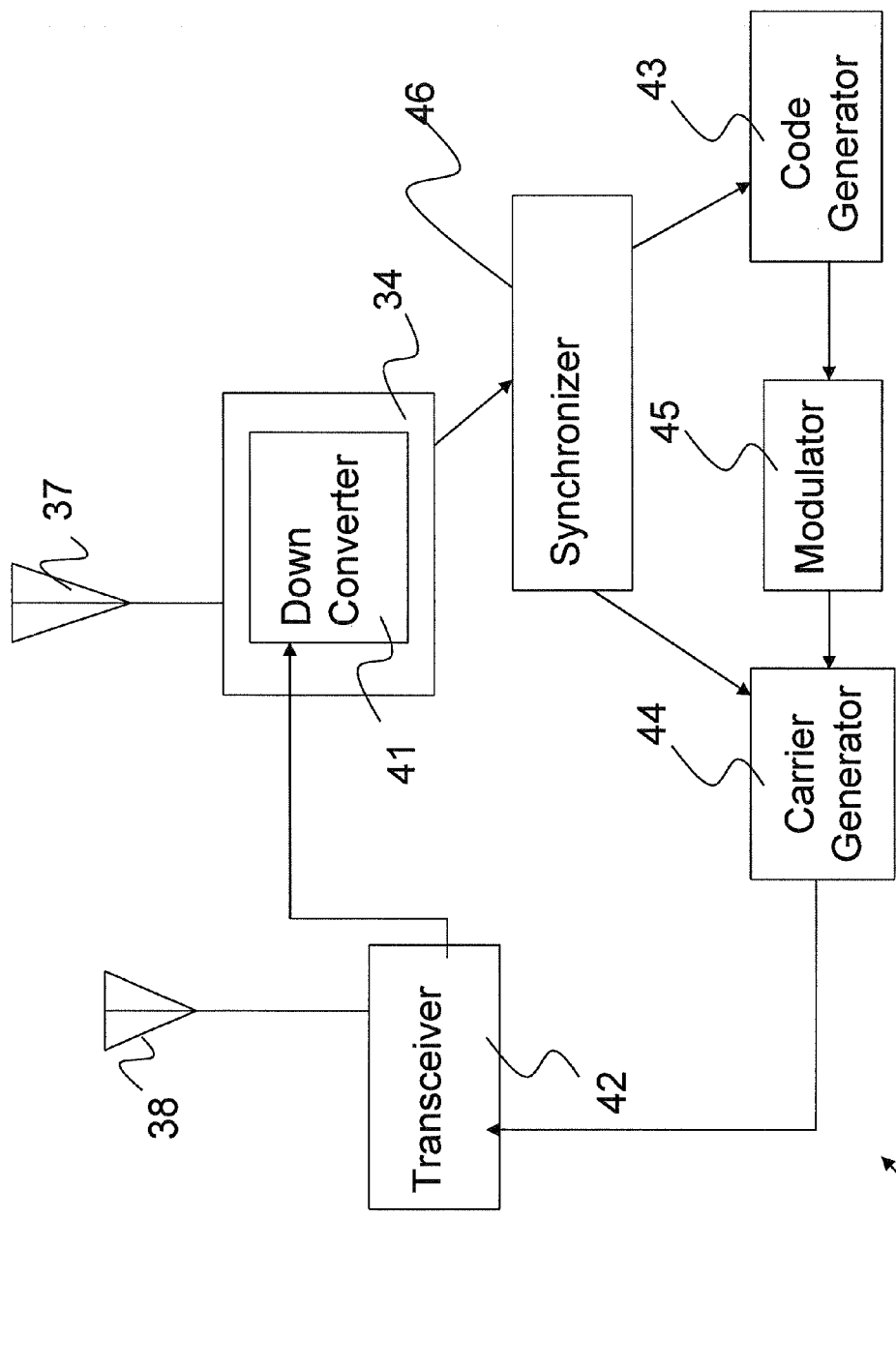
FIG. 2 is a diagram of a rover incorporating the invention

FIG. 1 depicts a base station, generally indicated at 10, that operates in conjunction with rovers 12, one of which is depicted in FIG. 2. Both the base station and the rovers make use of the ranging signals transmitted by a plurality of Earth-orbiting satellites 14.

The base station 10 includes an antenna 16 that picks up the signals from the satellites and passes them to a GNSS receiver 18. The receiver includes a down converter 20 that translates the satellite signals to an intermediate frequency. The down converter 20, a correlation and demodulation unit 22 and a code generator 24 are connected in a well known manner to synchronize carrier phase and the local codes produced by the code generator to the carrier and codes used by the individual satellites 14, and ultimately provide the position of the base station. The base station includes a processor 25 and an associated memory 27 containing software enabling the processor to perform the functions set forth above, as well as other calculations described herein.

The base station 10 also includes a transceiver 23, which transmits RF ranging and, as appropriate, other, signals to one of a group of antennas 30 and receives signals picked up by the antennas 30. The RF carrier for transmissions is generated by a carrier generator 24. A modulator 31 modulates the carrier with a local pseudo-random code that is similar to those transmitted by the satellites 14. The local code is provided by a code generator 26.

Preferably, messages transmitted by the base station use the same bipolar phase shift modulation arrangement used by the satellites. However, this modulation, provided also by the modulator 31, may be applied only to the quadrature phase of the carrier. The information in the messages may include information transmitted by the satellites 14, as well as other information described herein.

The ranging signal transmissions from the base station are synchronized with the satellite system time at the location of the base station. A synchronizer 36, for example, a phase locked loop, is provided between the transceiver 23 and the GNSS receiver 18, to ensure that the time and frequency of the transmissions are aligned with the time and frequency of the received satellite signals. Accordingly, the rovers can utilize the ranging signals transmitted by the base station in exactly the same way they treat the signals from the orbiting satellites. The in-phase version of the carrier is unmodulated by data, and thus, its demodulated code serves as a continuous "pilot" signal to which the rovers' receivers can accurately lock, even in poor signal quality locations.

The signals received by the antennas 30 pass from the antennas through the transceiver 23 to a down converter 33 in the receiver 18. Preferably the output of the converter 33 has the same intermediate frequency as the output of the down converter 20 so as facilitate processing the signals from the down converter by the correlation and demodulation unit 22.

With reference to FIG. 2, the details of a typical rover are exemplified by the depicted rover 12, which includes a GNSS receiver 34 that may have the same construction for GPS reception as the GPS receiver 18 in the base station. The rover also has an antenna 37 for reception of satellite signals and an antenna 38 for communications from and to the base station 10. A separate down converter 41 in the receiver 34 converts the signals received on the antenna 38, by way of a transceiver 42, to the intermediate frequency used in processing signals from the satellites 30. The rover further includes a code generator 43, a carrier generator 44 and a modulator 45, which operate like the generators 26 and 24 and modulator 31 in the base station. Each rover has a unique identification, which may be incorporated in its transmissions to the base station 10. Similarly, the base station may incorporate a rover's identification in its transmissions intended primarily for that rover. As described below, the unique identification for transmissions to the base station may be a pseudo-random code, such that the base station can readily separate the signals received from the respective rovers. Further, the base station may use the code in the received signals for rover clock error and/or rover range determination.

A synchronizer 46, for example, a phase locked loop, is provided between the downconverter 34 and the code and carrier generators 43 and 44 to ensure that the rover transmissions are aligned with the time and frequency of the satellite signals at the rover. This assists in performing time transfer measurements for range determination from the base station and/or TWTT from the base station to determine the clock error. As discussed, the clock error can then be removed from the list of unknown parameters in the position calculations. The synchronizer may also align the downconverter 41 to the reception of the base station ranging transmissions to assist in the reception of the satellite signals, as described above.

Usually each of the rovers 12 receives signals from orbiting satellites sufficient in number to ascertain the rover's position. However, from time to time, obstructions such as foliage, man-made structures, etc., may limit the number of satellite signals that are usable by a rover to fewer than the requisite four signals. The receiver 34 processes the signals from the base station 10 picked up by the antenna 38, along with the satellite signals picked up by the antenna 36. Accordingly, if the rover 12 receives signals from only three satellites instead of the requisite four (or more), the base station 10 provides the fourth ranging signal for position determination.

To cope with a rover's receipt of only two usable satellite signals, we prefer to have the base station 10 determine the range of the rover from the base station and the rover's direction. Specifically, the rover 12 returns the pseudo-random code received from the base station and the base station calculates the range to the rover by measuring the round-trip elapsed time of the code and the associated carrier phase delay. Alternatively, the rover sends a response a predetermined delay after receipt of a periodic time signal broadcast by the base station, and the base station determines the elapsed time of the transmitted code and the associated carrier phase delay in order to calculate the range.

The base station may also use the phase differences of the signals received by the respective ones of the antennas 30, to calculate, in a known manner, the azimuthal direction of the rover. The base station then transmits this information along with the range information to the rover 12. Having its GPS time and the ranges to two satellites from the usable satellite signals, and also the base station's range and known position, the rover then has sufficient data to calculate its position.

In addition to or as part of the ranging signals, the base station broadcasts messages that contain information about the satellites which are in view, as set forth above. By using this information the rovers improve their acquisition and tracking of weak satellite signals and thus enhance the accuracy of the position calculations.

Each rover may also use the base station broadcasts to reduce clock frequency errors, by synchronizing the rover's clock to the broadcast signal, at least until sufficient satellites are visible to train the rover's clocks to the satellite transmissions. As the wavelengths of the base station's transmissions are likely longer than those from the satellites, the Doppler error due to the rover's motion will be less than that from a single satellite, and the rover can more easily train its clock to the timing information in the base station's transmission. With multiple satellites, however, the rover can correct for its motion and create a more accurate clock model using the satellite signals.

To avoid collisions in transmissions from the rovers 12 to the base station 10, a time slot approach (such as TDMA) may be used, since each rover and the base station have sufficiently accurate time estimates. This will also facilitate automatic addition of additional rovers, as they will fill in blank time slots.

Alternatively, a polling procedure can be utilized, in which each rover 12 transmits only in response to a message from the base station 10 identifying that rover. Specifically, the base station transmits to each rover, in turn, a message that includes an identification of the rover. The rover responds and from the response, the base station calculates the information set forth above. In one polling arrangement, the rover transmits its position to the base station. The base station then selects another rover for the foregoing procedure.

The embodiments described above are half-duplex, but it is feasible to make this a full duplex system, so both the base station 10 and the rovers 12 can transmit and receive simultaneously, for example, by using different carrier frequencies. This would increase the complexity of the rovers but would provide a better time transfer capability and provide more signal energy to assist the rovers in acquiring the base station signals in poor signal environments.

It is well understood that the most significant ranging error from a terrestrial based transmission is multipath. Preferably a known multipath mitigation technique will be employed, which can reduce this error. Further, proper antenna design should be used for the base station and rover antennas, as well as proper siting of the base station antenna to attenuate reflections without attenuating the desired signals. As the range from the base station will be used by each rover in computing its position, the rover's antennas for receiving the satellite signals and the base station signals should have the same lateral position. This can be accomplished, for example, by placing a whip antenna for the base station signals in the center of a patch antenna used for the reception of satellite signals. With different frequencies of the base station and satellite signals, there should not be a problem with interference, and the rover will determine ranges to the same location. Otherwise, the rover may determine ranges to different antenna locations and include an offset that compensates for the differences in the antenna locations when determining position.

Rather than having each rover compute its own position it is also possible for it to transmit back to the base station its raw measurement data, and have the base station perform the position calculations. The base station then transmits back to the rover the rover's position. As discussed, the base station may transmit the information on the quadrature phase of the base station ranging signal, or using other transmissions.

With the arrangement described herein, the base station 10 may record the positions of all of the rovers 12. This information is thus available to anyone who wishes to monitor the locations and movements of the rovers.

Whenever a rover 12 is put into, or taken out of, service, an operator can enter that information into the base station 10, so that the base station has an up-to-date list of the rovers to be polled by it.

From the foregoing it will be apparent that many of the calculations described above can be performed in either the base station or the rovers. Further, the base station is described as using multiple antennas to receive signals transmitted by the rovers but may instead use a single antenna to achieve certain of the advantages described above. In addition, each rover may be associated with a unique identification code that is used by the base station to direct transmissions to that rover and the identification code may differ from the pseudo-random code used by the rover in transmissions to the base station.

What is claimed is:

1. A system for enhancing position determination by a rover using a satellite ranging system to ascertain their locations, the system comprising:

A. a base station including:
one or more receivers for receiving and processing ranging signals from multiple earth-orbiting satellites and signals from one or more rovers and determining information relating to position, timing, or both, for the base station and the respective rovers, and
a transmitter for broadcasting one or mere ranging signals based on the location of the base station, the base station ranging signals being timed in accordance with the satellite ranging system time at the location of the base station, the transmitter further transmitting information related to one or both of the locations of and the timing at the respective one or more rovers;

B. the one or more rovers, each rover including
one or more receivers for receiving and processing the information transmitted by the base station and the ranging signals broadcast from the satellites and the base station and determining positions, timing, or both, and
a transmitter for transmitting to the base station signals that are aligned with satellite ranging system time at the location of the rover.

2. The system defined in claim 1 in which the base station synchronizes codes and carriers of the ranging signals with codes and carriers of received satellite signals.

3. The system defined in claim 2 in which the base station transmits to the rovers information about the satellites in view.

4. The system defined in claim 3 wherein the base station further transmits information about the characteristics of the satellite signals.

5. The system defined in claim 4 wherein the base station transmits the information by modulating the information onto the ranging signal.

6. The system defined in claim 5 wherein the base station transmits the information on a quadrature channel of the ranging signal.

7. A ranging base station comprising:
A. a receiver for receiving and processing ranging signals from multiple earth-orbiting satellites; and
B. a transceiver for
receiving and processing signals from one or more rovers that are aligned with satellite ranging system timing at the location of the rovers and determining information relating to positions, timing or both, of the respective rovers, broadcasting ranging signals based on the location of the transceiver and timed in accordance with the satellite ranging system time at the location of the base station, and transmitting to the respective rovers the information relating to the positions, timing or both of the respective rovers.

8. The base station of claim 7 further wherein the transceiver broadcasts the ranging signals with codes and carriers synchronized to codes and carriers of received satellite signals.

9. The base station of claim 8 wherein the transceiver further transmits information about the satellites in view and about the characteristics of the satellite signals.

10. The base station of claim 8 wherein the transceiver transmits the information by modulating the information onto the ranging signals.

11. A method for enhancing position determination by rovers that use a satellite ranging system for location determination, the method comprising the steps of:
A. providing a fixed base station having a receiver for receiving ranging signals transmitted by orbiting satellites and communication signals transmitted by the rovers;
B. providing at the base station a transceiver for
transmitting ranging signals to the rovers, the signals being synchronized to the satellite system time at the base station, whereby the base station serves as a ranging base for the rovers' calculation of location, and
receiving signals from the rovers;
C. transmitting a timing signal from the base station to the rovers;
D. transmitting return timing signals by respective rovers in response to the timing signal received from the base station, the rovers transmitting the signals after predetermined delays; and
E. using the elapsed time of the return timing transmission and the predetermined delay to calculate the range from the base station to the rover.

12. The method of claim 11 wherein the base station ascertains the azimuthal direction from the base station to the rover and uses this information to refine the position estimate of the rover to assist the rover in calculating its position.

13. The method of claim 11 wherein
A. each timing signal transmitted by the base station identifies a given rover; and
B. each rover transmits the return timing signal only in response to the receipt of the timing signal identifying that rover.

14. The method of claim 11 wherein the respective rovers transmit return timing signals in preassigned time slots.

15. The method of claim 11 wherein the ranging signals transmitted by the base station:
i. have the same format as the ranging signals transmitted by the orbiting satellites; and
ii. are synchronized to satellite ranging system time at the location of the base station.

16. The method of claim 15 in which codes and carriers in the ranging signals are synchronized to codes and carriers in received satellite signals.

17. The method of claim 16 in which the timing signals have the form of modulation of the ranging signals transmitted by the base station.

18. The method of claim 11 including the step of calculating the ranging system time at the location of the rover by means of two way time transfer.

19. The system of claim 1 wherein
the base station determines ranges to the respective rovers based on the signals received from the rovers, and
the information transmitted by the base station is the ranges to the respective rovers.

20. The system of claim 1 wherein
the base station includes a plurality of antennas, and
the base station receivers determine directions of the respective rovers based on phase differences in the signals received from the rovers at two or more of the antennas; and
the information transmitted by the base station is the directions of the respective rovers.

21. The system of claim 1 wherein
the base station includes a plurality of antennas, and
the base station receivers calculate azimuth of the respective rovers based on phase differences in the signals received from the rovers at two or more of the antennas; and
the information transmitted by the base station is the azimuth of the respective rovers.

22. A system for enhancing position determination, the system comprising:
A. a base station including:
a plurality of antennas for receiving satellites signals and signals from one or more rovers;
one or more receivers for processing ranging signals from multiple earth-orbiting satellites and signals from one or more rovers to determine satellite ranging system time and direction information for respective rovers, and
a transmitter for
broadcasting a ranging signal based on the location of the base station, the base station ranging signal being timed in accordance with the satellite ranging system time at the location of the base station, and
transmitting rover direction information separately or as part of the ranging signal;
B. the one or more rovers, each rover including
one or more receivers for receiving and processing ranging signals from the satellites and the ranging signal and direction information from the base station, the one or more rovers determining their respective positions and timing from at least the ranging signals received from the base station and direction information, and
a transmitter for transmitting to the base station signals that are aligned with satellite or base station ranging system time at the location of the rover.

23. The system of claim 22 wherein the base station receivers determine ranges to the respective rovers based on the signals received from the rovers and the base station transmitter transmits the ranges to the respective rovers.

24. The system of claim 23 wherein the rover receivers align rover time to the timing in the base station ranging signals to assist in reception of the satellite signals.

25. The system of claim 23 wherein the base station further calculates azimuth information for respective rovers, and transmits the azimuth information to the respective rovers.

26. The system of claim 22 wherein the plurality of antennas includes an antenna for receiving satellite signals and multiple co-located antennas for receiving signals transmitted by the rover.

27. A method for enhancing position determination by rovers that use a satellite ranging system for location determination, the method comprising the steps of:

A. providing a fixed base station having a receiver for receiving and processing ranging signals transmitted by orbiting satellites and communications from the rovers;

B. providing at the base station a transmitter for transmitting to the respective rovers signals that are part of two-way time transfers between the rovers and the base station; and C. providing at the rovers receivers for receiving and processing ranging signals transmitted by orbiting satellites and communications from the base station that are part of the two-way time transfers;

D. providing at the rovers transmitters that transmit signals that are part of the two way time transfers; and E. utilizing the two way time transfer signals in addition to the satellite ranging signals to determine positions at the rovers.

* * * * *